US006856878B2

(12) United States Patent
Braunhardt et al.

(10) Patent No.: US 6,856,878 B2
(45) Date of Patent: Feb. 15, 2005

(54) ON-BOARD COMPUTER SYSTEM HAVING TWO OPERATING MODES

(75) Inventors: Klaus Braunhardt, Zweibrucken (DE); Lutz Bischoff, Dellfeld (DE); Folker Beck, Bettendorf, IA (US); Britta Stankewitz, Pforzheim (DE); Peter Ehinger, Ditzingen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/322,823

(22) Filed: Dec. 18, 2002

(65) Prior Publication Data

US 2003/0130766 A1 Jul. 10, 2003

(30) Foreign Application Priority Data

Dec. 22, 2001 (DE) .......................... 101 63 947

(51) Int. Cl.$^7$ ........................... A01D 41/12; B60K 37/06
(52) U.S. Cl. ........................... 701/50; 701/1; 56/10.2 R; 56/10.8
(58) Field of Search ................. 701/50, 1; 56/10.2 R, 56/10.2 A, 10.2 H, 10.8

(56) References Cited

U.S. PATENT DOCUMENTS

| | | | | |
|---|---|---|---|---|
| 4,296,409 A | * | 10/1981 | Whitaker et al. | ........... 340/684 |
| 4,376,298 A | | 3/1983 | Sokol et al. | ........... 364/551 |
| 5,666,793 A | * | 9/1997 | Bottinger | ........... 56/10.2 R |
| 5,978,720 A | | 11/1999 | Hieronymus et al. | ........... 701/29 |
| 5,978,723 A | * | 11/1999 | Hale et al. | ........... 701/50 |
| 6,119,442 A | * | 9/2000 | Hale | ........... 56/10.2 H |
| 6,289,332 B2 | | 9/2001 | Menig et al. | ........... 707/1 |

FOREIGN PATENT DOCUMENTS

| | | |
|---|---|---|
| DE | 33 46 370 C2 | 7/1985 |
| DE | 36 09 927 A1 | 10/1987 |
| DE | 37 08 324 A1 | 9/1988 |
| DE | 3708324 * | 9/1988 |
| DE | 40 33 574 A1 | 5/1991 |
| DE | 40 29 312 A1 | 3/1992 |
| DE | 44 33 953 A1 | 3/1996 |
| DE | 196 01 920 C1 | 12/1996 |
| DE | 197 07 188 A1 | 8/1998 |
| DE | 197 15 325 A1 | 10/1998 |
| DE | 198 00 238 C1 | 8/1999 |
| DE | 198 29 568 A1 | 1/2000 |
| DE | 199 11 936 C2 | 9/2000 |
| DE | 200 13 646 U1 | 1/2001 |
| DE | 199 39 065 A1 | 2/2001 |
| DE | 101 02 420 A1 | 6/2001 |
| DE | 199 59 755 A1 | 6/2001 |
| DE | 199 61 376 A1 | 6/2001 |
| DE | 100 01 263 A1 | 7/2001 |
| DE | 100 05 566 A1 | 8/2001 |
| EP | 0 499 567 A2 | 8/1992 |
| EP | 1 024 056 A2 | 8/2000 |
| EP | 1 031 263 A2 | 8/2000 |
| JP | 08023748 A | 1/1996 |

\* cited by examiner

Primary Examiner—Tan Q. Nguyen

(57) ABSTRACT

An on-board computer system for a work vehicle having an actuator. The computer system comprises an electronic control unit that is connected to and controls the actuator, a display unit and an input unit. The display unit displays operating parameters of the work vehicle. Through the input unit the operator inputs operating parameters of the work vehicle. The control unit transmits control signals to the actuator and can be operated selectively in a first operating mode and in a second operating mode. In the first operating mode the control unit displays a greater number of operating parameters that can be changed by the input unit than in the second operating mode.

10 Claims, 4 Drawing Sheets

104

| | |
|---|---|
| (300) 10mm | (312) 8 km/h |
| (302) 750 U/min. | |
| (304) 10mm | (310) 1979 U/min. |
| (306) 8 mm | |
| (308) | (314) 1000 l |

| | |
|---|---|
| | (312) 8 km/h |
| (308) | |
| | (314) 1235 l |

ON-BOARD COMPUTER SYSTEM HAVING TWO OPERATING MODES

FIELD OF THE INVENTION

The present invention is directed to an on-board computer system for a work vehicle having two operating modes for operators of different levels of training. In the first operating mode the control unit displays a greater number of operating parameters that can be changed by an input unit than in the second operating mode.

BACKGROUND OF THE INVENTION

DE 40 29 312 A describes an optical display assembly for a vehicle in which operating data is projected onto a windshield of the vehicle. The data to be displayed are selected either by an operating mode switch connected to a control assembly which is also used for the selection of the operating mode of the machine or automatically as a function of the significance of the data, in which the data is compared to pre-determined boundary values and is displayed when these boundaries are crossed. An operating mode is displayed at all times and the corresponding operating value is displayed as well.

DE 200 13 646 U proposes a computer display for a forest products or an agricultural machine in which an input is performed on an additional, relatively large membrane keyboard. The membrane keyboard may also be equipped with input keys. The data to be displayed, the input keys and the size and color of the data can be selected.

EP 1 031 263 A concerns an assembly for the adjustment of operating parameters for the control of agricultural machines. The assembly includes a control and regulating unit that is connected to an operator's terminal, sensors and actuators. With the operator's terminal an operator can provide the operating parameters of the machine as input. The operating terminal is also equipped with a display element. Various operating modes are proposed for the control and regulating unit. In addition to a so-called normal operating mode, at the first operating sequence, for example, an adjustment mode is provided in which parameters can be provided as input. In the case of a failure of the operating terminal an emergency operating mode is provided that can also be activated by means of a switch. In the emergency operating mode inputs can be provided by sensors that are normally used for the detection of operating data of the machine. The type of the displays and the possible inputs for the various modes is not specified in any further detail.

Agricultural harvesting machines, particularly combines, are relatively complex machines with a relatively high number of crop processing assemblies whose operating parameters must be adjusted to conform to the immediate harvesting conditions. The adjustments are relatively critical since they all strongly affect the results of the operation. In actual machines the adjustable crop processing assemblies are adjusted or controlled electronically by a control assembly that includes one or more microprocessors distributed over the machine. The immediate operating parameters can be recalled through display assemblies and changed by means of input devices. While experienced operators as a rule have no trouble in reading all operating parameters that are available and to change these if a change is useful, less experienced operators are frequently overwhelmed by the large number of operating parameters displayed. They also are frequently not in a position to perform meaningful inputs.

SUMMARY OF THE INVENTION

It is an object of the present invention to provide a control assembly for a work vehicle that can be operated successfully by operators with varying degrees of training and/or prior experience.

The invention proposes that the control assembly be operable selectively in at least a first and a second operating mode. In a first operating mode, that is particularly appropriate for experienced operators, a large number of operating parameters of the work vehicle can be displayed and/or changed by inputs. The second operating mode is appropriate particularly for operators with little experience and permits a display and/or input of considerably fewer operating parameters than the first operating mode. As a rule at least one operating parameter is displayed. An input possibility is not necessarily required in the second operating mode.

In this way the experienced operator is offered all possible adjustments, while a beginner is offered a choice of simple operations. Further operating modes are also conceivable whose degree of difficulty lies between that of the first and the second operating mode.

The operating parameters that can be reproduced on the display assembly as a rule are values to which actuators are adjusted and/or measured values of sensors or values derived from these. As a rule information about an operating parameter (its name or an abbreviation) is displayed along with the current value. Operating parameters that can be provided as input may be values to which an actuator is adjusted or desired operating results such as, for example, grain losses or other target inputs. The control assembly controls the actuator or the actuators as a function of the operating parameters that have been provided as input. In those cases in which specific operating parameters have not been provided as input, particularly in the second operating mode, the control assembly reverts to calculated values and/or values stored in memory for the operating parameters. Thereby measured values from sensors can also be considered. In both operating modes inputs that can be changed by the operator can be displayed that are based on calculated and/or stored values.

The operating mode is preferably selected on the basis of information depending on the particular operator. In this way the names of the possible operators can be stored in memory in a table along with the operating modes associated with these names. Following the input of the name, the operating mode is selected automatically. The system can also be secured by passwords. In a simpler form of the configuration the operating mode is selected by the operator.

Information considered by the control assembly that corresponds to the operating parameters of the work machine in the various operating modes that can be displayed or changed, may be permanently stored in memory. An input or a possible change may be provided by the operator or after an input of a special password.

In one embodiment the language in which the information is reproduced on the display can be selected. For this purpose the data necessary for a display are stored in memory under various addresses. On the basis of the selected, desired language the data needed for the display of information are recalled from memory at the corresponding address. The language may be specific to the site or specific to the country or may be changed by the operator (if necessary, after a password input).

The operating parameters that can be displayed frequently have varying degrees of significance to the operator. In that way the temperature inside the cab is less important than the crop throughput. The temperature of the engine is also basically less interesting as long as it does not exceed or fail to reach a limit value. In order to be able to bring to the operator's attention particularly important operating parameters, an obvious solution therefore is the use of a colored display assembly and to select the color of the operating parameters displayed according to the importance of the particular parameter. Important operating parameters may be shown continuously in signaling colors, for example, red, or only if a certain limit value is exceeded. The operating parameters that can be displayed are thereby associated with their importance and/or color information.

The on-board computer system according to the invention is appropriate for any desired work machine, for example, forest products, agricultural or construction machines. In view of the problems cited above of the high number of actuators, that may require relatively complex displays, which could possibly overwhelm less experienced operators, it is particularly appropriate for harvesting machines in which the actuator or the actuators are provided for the adjustment of crop processing assemblies.

In harvesting machines it may depend on the particular variety of grain to be harvested which operating parameters are of particular interest to the operator. In that way in the case of a first variety of grain the slot of the thresher drum may be particularly critical, while with a second variety of grain the width of the opening of the sieve is the most critical. Therefore it is proposed that the particular variety of grain can be provided as input and/or detected by a sensor and that the operating parameters that can be displayed or provided as input are a function of the variety of grain detected. In order to make possible the simplest operation only the particularly critical operating parameters could be displayed or changed. Here the number of the operating parameters that can be changed and/or displayed in the operating mode depending on the variety of grain are not necessarily distinguished in the control assembly.

BRIEF DESCRIPTION OF THE DRAWINGS

FIG. 3 is a view of the display assembly of the operating unit in the first operating mode.

FIG. 4 is a view of the display assembly of the operating unit in the second operating mode.

DETAILED DESCRIPTION

Figure 1:
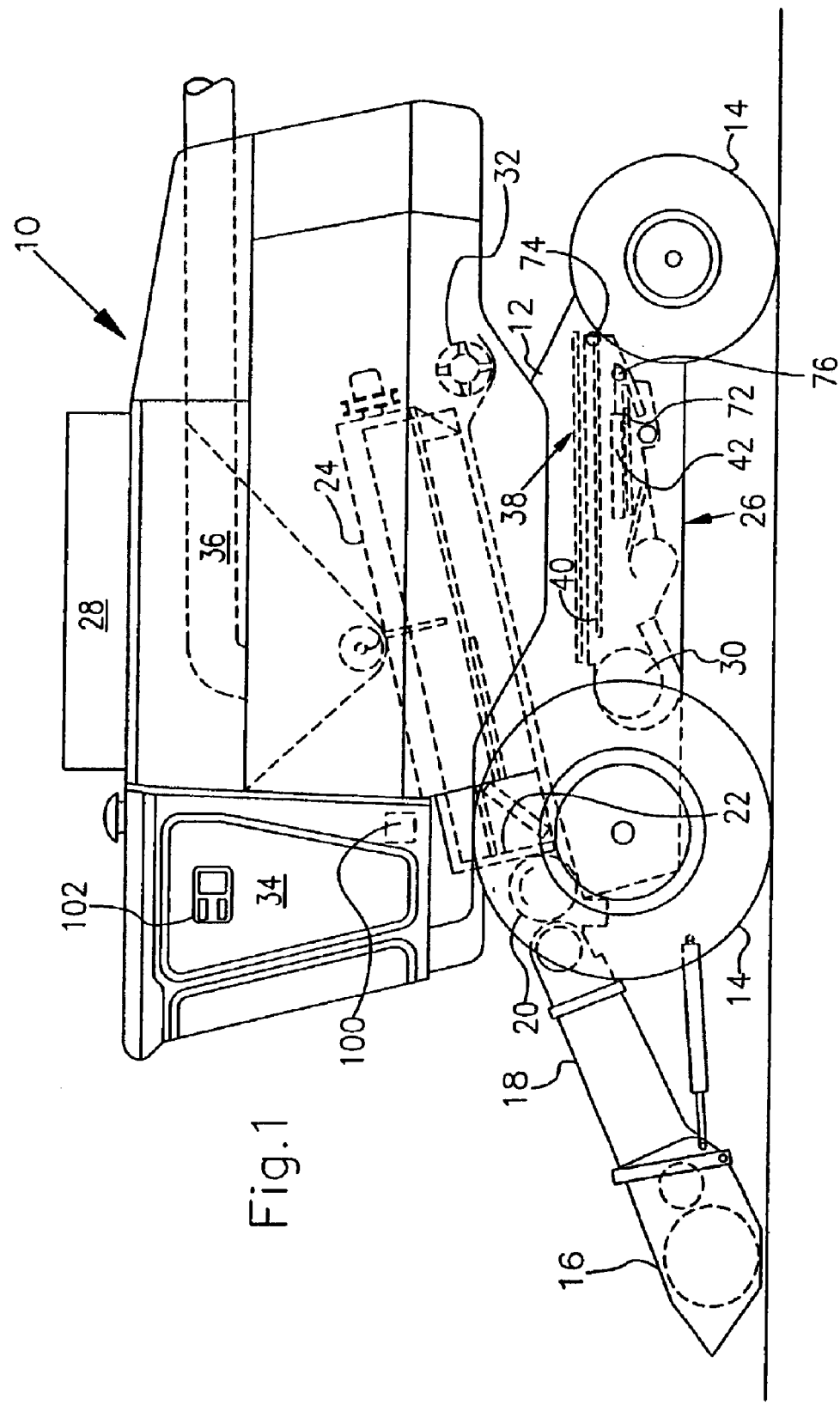
FIG. 1 is a semi-schematic side view of an agricultural combine.

FIG. 1 shows the side view of a self-propelled agricultural combine 10. Although the present invention is disclosed on the basis of an axial flow combine, it can also be applied to conventional and other combines as well as to any desired other type of work and agricultural machine.

The combine 10 contains a support structure 12 with wheels 14. A harvesting assembly 16 extends forward from the combine 10 and conducts harvested crop to a feeder house 18. The feeder house 18 contains a conveying assembly in order to conduct the harvested crop to the threshing, separating and cleaning assemblys of the combine 10. The feeder house 18 conducts the harvested crop to an infeed beater 20 that extends in the transverse direction and that supplies the crop through an inlet transition section 22 to an axial threshing and separating assembly 24. Grain and chaff are conducted by the axial threshing and separating assembly 24 to a cleaning assembly 26. The cleaning assembly 26 in turn conducts the grain that has been cleaned to a grain tank 28 and the chaff is blown by the cleaning blower 30 out of the rear side of the combine. Large crop componenets that is neither grain nor chaff is conducted by the axial threshing and separating assembly 24 to a discharge beater 32 arranged in the transverse direction which conveys this material out of the rear side of the combine 10. Crop that is stored temporarily in the grain tank 28 can be discharged by the actuation of a discharge auger 36 by the action of an operator in an operator's cab 34.

In the cleaning assembly 26 an upper sieve 40 and a lower sieve 42 are arranged above each other. During the operation of the cleaning assembly 26 the sieves 40 and 42 themselves perform a vibration in such a way that the harvested crop separated by the threshing and cleaning assembly 24 is accepted and conveyed against the direction of operation of the combine 10. The upper sieve 40 and the lower sieve 42 are equipped with adjustable plates extending in the transverse direction that are fastened to a rectangular frame, that is supported by the side walls of a cleaning shoe. In order to attain the optimum degree of cleaning in the cleaning assembly 26 the rotational speed of the cleaning blower 30 and the width of the opening of the sieves 40 and 42 can be varied. Therefore each of the sieves 40 and 42 is associated with a repositioning drive 74 or 76 for the repositioning of the width of the sieve opening. The electrically driven repositioning drives 74 and 76 are arranged for the repositioning of the pivot angle of the plates. In each case a sieve opening sensor, not shown, is arranged to detect the position of the plates of the lower sieve 42. The upper sieve 40 is also associated with a sieve opening sensor, not shown. A control unit 100 arranged in the operator's cab 34 that is electrically connected with the sieve opening sensors and the repositioning drives 74 and 76 drives the repositioning drives 74 and 76 to adjust the width of the sieve openings.

The control unit 100 is located in the operator's cab 34 of the combine 10. It controls the repositioning drives 74 and 76 and is connected with a further sensor in addition to the sieve opening sensors. Underneath the lower sieve 42 a grain sensor 72 is arranged that measures the amount of grain delivered downward through the lower sieve 42.

Figure 2:
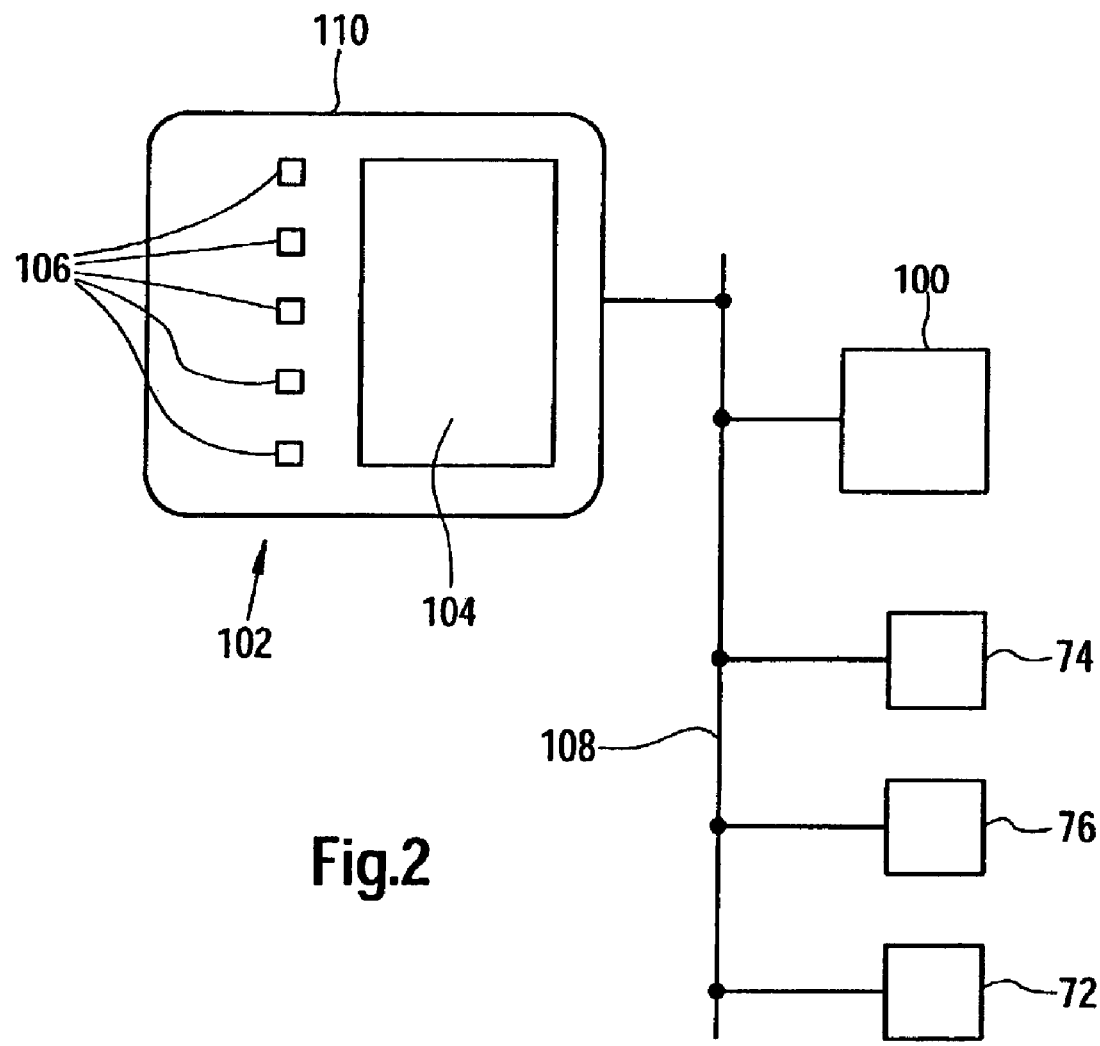
FIG. 2 is a schematic view of an on-board computer system.

An operating unit 102 is located in the operator's cab 34 and is shown in greater detail in FIG. 2. The operating unit 102 includes a housing 110 in which a display unit 104 and an input unit in form of input keys 106 are provided. The input keys 106 are arranged to the left of the display unit 104. In place of the input keys 106 or in addition thereto a voice input unit or any other desired input unit may also be provided.

The operating unit 102 is connected over a bus 108 to the repositioning drives 74 and 76, the separating sensor 72 and the control unit 100. The display unit 104 displays several operating parameters of the combine 10 to the operator. The input keys 106 permit a change and/or selection of operating parameters. The control unit 100 receives the immediate input data from the input keys 106 and drives the affected actuators or other elements of the combine 10 that can be controlled electronically to the desired value. For example, in the case of the width of the opening of the sieves 40 and 42 a control is performed by means of the sieve opening sensors which transmit the current sieve opening value to the control unit 100. The control unit 100 then brings about a repositioning of the plates by means of the repositioning drives 74 or 76. Furthermore the control unit 100 can adjust or control the forward propulsion velocity of the combine 10, the rotational speed of the axial threshing and separating assembly 24, the width of the slot in the threshing and/or separating region, the rotational speed of the main drive engine and other operating parameters. A partial or complete automation is possible, where the control unit 100 adjusts the operating parameters of the actuators of the combine 10 that can be controlled by it as a function of sensor signals (for example, of the grain sensor 72) so that only a few or no inputs at all are required from the input keys 106.

The operating unit 102 contains electronic components that make possible a transmission of the data that is to be displayed by the display unit 104 and the data that have been provided as input by the input keys 106 over the bus 108 to the control unit 100. The operating unit 102 may be equipped with its own microprocessor and/or microcontroller. It would also be conceivable to integrate the control unit 100 into the operating unit 102 or the inverse. The operating unit 102 may be removable in order to be able to apply it to other machines.

Thereby the combine 10 contains a relatively large number of elements whose adjustment can affect the result of the operation of the combine 10. It is possible only for a relatively experienced operator to have all elements of the combine 10 that can be influenced to conform in each case to the immediate optimum operating parameters. For a less experienced operator it makes more sense if the operating parameters are provided as input and as few inputs as possible are required, since then the possibility of errors is reduced.

According to the invention the operating assembly 102 makes available various operating modes. In a first operating mode, that is particularly appropriate for experienced operators, the operating parameters of all adjustable elements can be displayed and changed. They need not all be displayed simultaneously on the display unit 104, but may be recalled by means of menus or sub-menus, in which useful operating parameters may be grouped. The operator may change these parameters corresponding to his experience and ideas by means of the input keys 106. FIG. 3 shows an example of the display unit 104 in the first operating mode. The left half of the display unit 104 shows parameters that can be changed and their present selected values, particularly the size of the threshing slot 300, rotational speed of the rotor 302 of the threshing and separating assembly 24, the width of the opening of the upper sieve 40 and the lower sieve 42, 304 and 306, and the variety of grain 308. The right half of the display unit 104 shows parameters that are permanently provided as input (for example, the rotational speed of the engine 310) that can be changed by means other than the input keys 106 (for example, the forward propulsion velocity 312 that can be controlled by a drive lever) or that are only indirectly controlled or that represent the result of the operation (for example, the contents of the grain tank 314).

In case that an operator with only limited experience operates the combine, the operating unit 102 is operated in a second operating mode. In this operating mode only a few inputs are possible. An example is shown in FIG. 4, in which only the variety of grain 308 is displayed on the left half of the display unit 104. The right half of the display unit 104 also displays fewer data than in the first operating mode; the rotational speed of the engine is not shown. In the second operating mode only the parameters reproduced in the left half of the display unit 104 can be changed, that is, in the example shown, only the variety of grain 308. The control unit 100 adjusts the elements of the combine 10 that can be controlled by it to operating parameters that can be calculated on the basis of the variety of grain 308 provided as input or are recalled from a table. At that time measured values from sensors, for example, from the separating sensor 72, can be considered. The second operating mode permits the operator to change only the variety of grain, on which the control unit 100 has based the operating parameters, but no further parameters. Thereby there is only a slight danger that the result of the operation is impaired by input errors.

On its left half the display unit 104 displays the operating parameters that can be changed with the input keys 106. The current meaning of the input keys 106 is thereby reproduced (in pictures or characters) in signs on the adjoining region of the display unit 104. In the example according to FIG. 4 the variety of grain 308 can be provided as input by means of the upper input key 106. Further keys may also be provided with which, for example, a cursor can be controlled or menus and sub-menus can be recalled.

Figure 5:
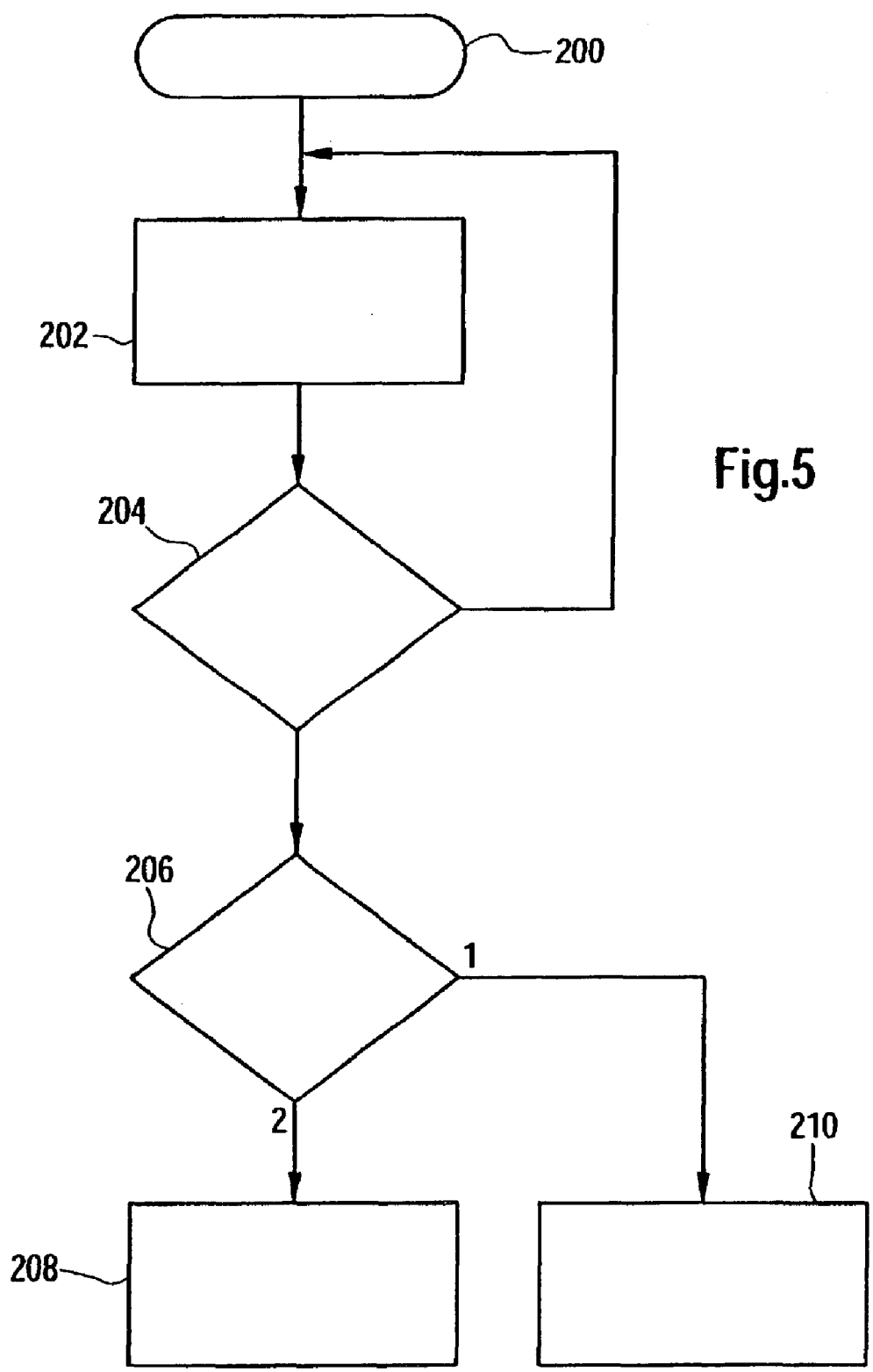
FIG. 5 is a flow diagram for operation of the control unit.

FIG. 5 shows a flow diagram according to which the control unit 100 proceeds upon starting of the main drive engine of the combine 10. After the start in step 200 the operator is given the choice in step 202 of giving as input his name and a password by means of the input keys 106. The names and passwords of the persons authorized to operate the combine 10 are stored in memory in the control unit 100, which can be performed by a supervisor who has a corresponding authorization. In the control unit 100 information is also stored in memory as to which operator is associated with which operating mode.

In the following step 204 the question is posed whether a false password has been entered. If this is the case, step 202 again follows. Otherwise step 206 follows in which the question is posed with which operating mode the operator is associated. If this operator is associated with the first operating mode, step 210 follows, in which the operating unit 102 operates in the first operating mode. Otherwise step 208 follows in which the operating unit 102 operates in the second operating mode.

Having described the illustrated embodiment, it will become apparent that various modifications can be made without departing from the scope of the invention as defined in the accompanying claims.

What is claimed is:

1. An on-board computer system for a work vehicle, comprising an electronic control unit that is connected to an actuator, a display unit and an input unit, the display unit can be operated to display operating parameters of the work vehicle, the input unit is arranged to input operating parameters of the work vehicle by en operator and the control unit is arranged to transmit control signals to the actuator and to be operated selectively in a first operating mode and in a second operating mode, wherein in the first operating mode the control unit displays a greater number of operating parameters that can be changed by the input unit than in the second operating mode and wherein the operating parameters can be changed in both the first and second operating modes by the input unit.

2. An on-board computer system as defined by claim 1 wherein the control unit receives operator information from the operator and the control unit selects the operating mode based on the operator information.

3. An on-board computer system as defined by claim 2 wherein at least some of the operating parameters that can be changed by the input unit that are displayed are permanently stored in memory.

4. An on-board computer system as defined by claim 3 wherein at least some of the operating parameters that can be changed by the input unit that are displayed are provided as input.

5. An on-board computer system as defined by claim 2 wherein at least some of the operating parameters that can be changed by the input unit that are displayed are provided as input.

6. An on-board computer system as defined by claim 1 wherein the display unit that can be supplied with data that can be recalled from memories with different addresses, where the addresses of the particular memory are a function of a language that can be selected.

7. An on-board computer system as defined by claim 1 wherein the display unit is colored, and that the color of the particular indicated operating parameter is a function of its relative importance.

8. An on-board computer system for an agricultural harvesting machine, comprising an electronic control unit that is connected to an actuator for controlling a crop processing assembly, a display unit end an input unit, the display unit can be operated to display operating parameters of the harvesting machine, the input unit is arranged to input operating parameters of the harvesting machine by an operator and the control unit is arranged to transmit control signals to the actuator and to be operated selectively in a first operating mode and in a second operating mode, wherein in the first operating mode the control unit displays a greater number of operating parameters that can be changed by the input unit than in the second operating mode and wherein the operating parameters can be changed in both the first and second operating modes by the input unit.

9. An on-board computer system as defined by claim 8 wherein the agricultural harvesting machine harvests various types of grain and information as to the type of grain being harvested is provided as an input, and that the operating parameters being displayed are a function of the type of grain being harvested.

10. An on-board computer system as defined by claim 9 wherein the control unit receives operator information from the operator and the control unit selects the operating mode based on the operator information.

* * * * *